United States Patent Office 3,535,888
Patented Oct. 27, 1970

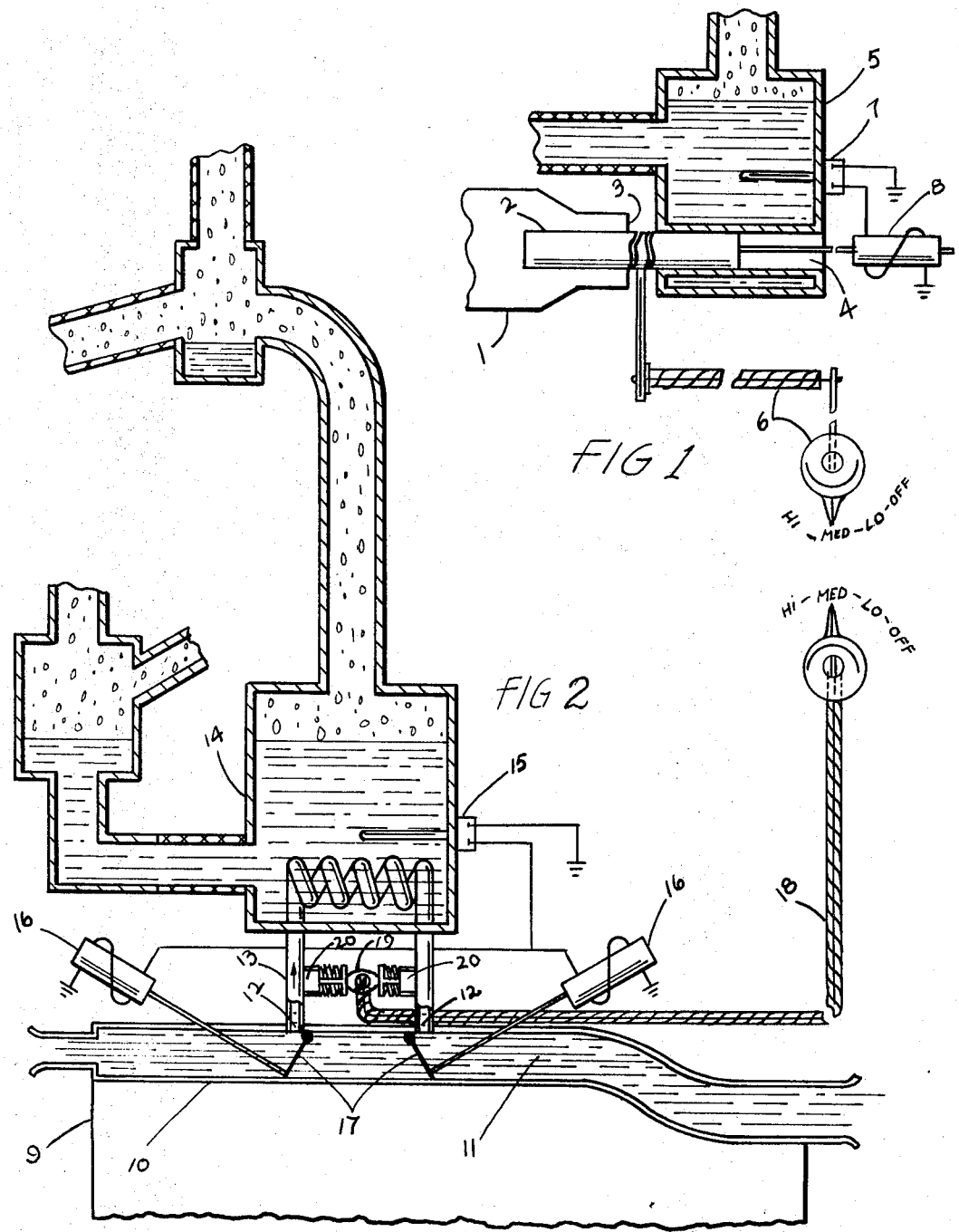

3,535,888
AUTO EXHAUST ACTUATED GENERATOR DEVICE FOR ABSORPTION AIR CONDITIONERS
Joseph M. Eannarino and Michael S. Granieri, Jr., Rome, N.Y., assignors to Tramtec Industries, Inc., Rome, N.Y.
Filed July 29, 1968, Ser. No. 748,426
Int. Cl. F25b *15/00*
U.S. Cl. 62—148     4 Claims

ABSTRACT OF THE DISCLOSURE

An auto exhaust actuated generator device for absorption air conditioners utilizing heat from hot gases exiting from an antismog afterburner with remote control means for manually controlling cooling action of the air conditioner by variation of the degree of heat exchange by movement of a metal bar between the afterburner and generator or by variation of flow of heat exchange liquid between the afterburner and the heat exchange coil in the generator or through variation of hot gas flow through heat exchange channels that encompass the generator, and with safety features employing thermostats for preventing overtemperature of the generator and the refrigerant contained therein.

---

Figure 3:
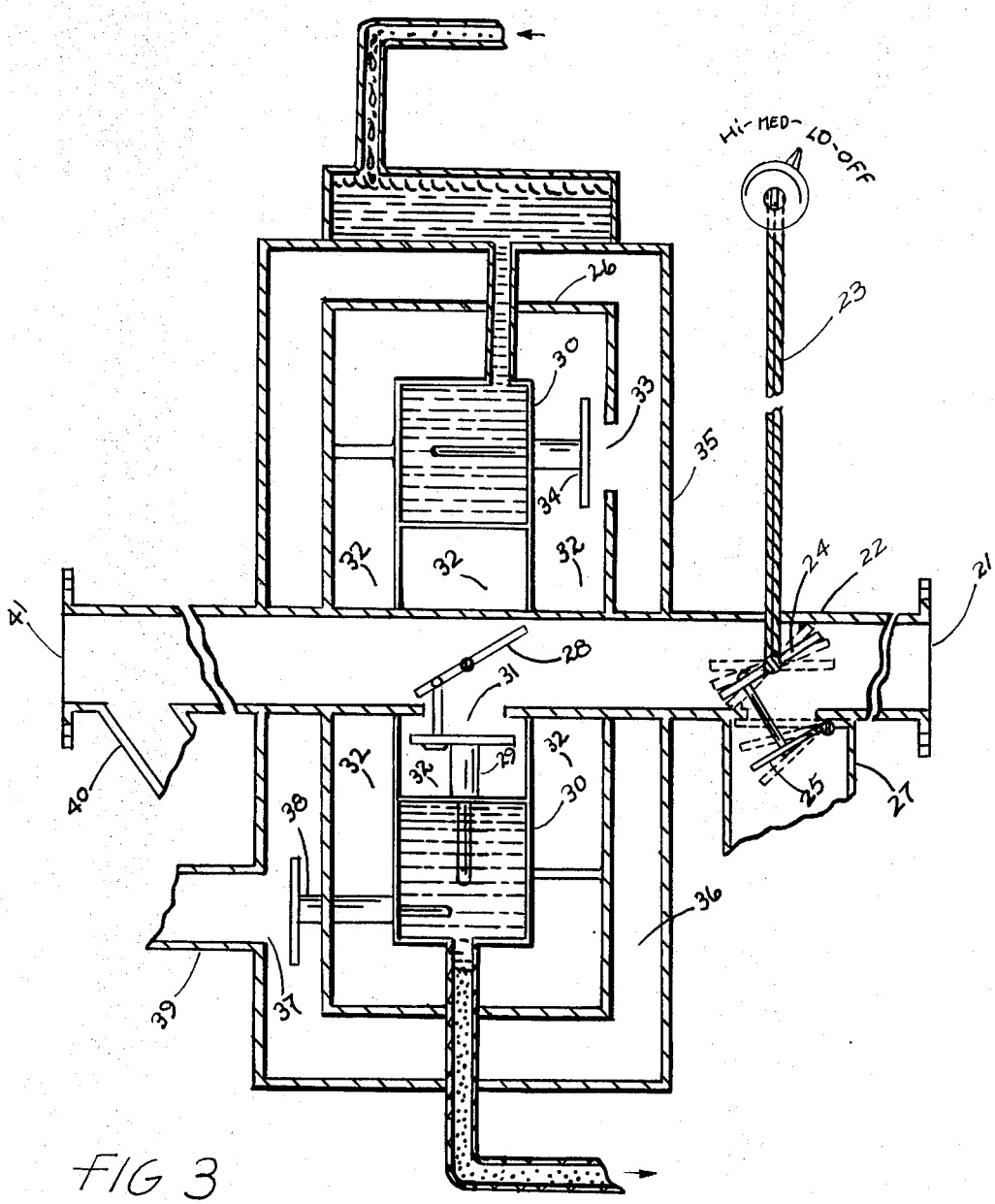

This invention relates to automobile air conditioning systems and more particularly to auto exhaust actuated generator device for air conditioners for use in automobiles, buses, trucks, fixed power plants, and trains.

Devices of the general nature of that to be disclosed for auto exhaust actuated generator device for absorption air conditioners are shown in the following patents: Bourassa, 2,783,622, Mar. 5, 1957; De Cicco et al., 2,953,907, Sept. 27, 1960; Ruse et al., 3,009,303, Nov. 14, 1961; Pippert et al., 3,153,441, Oct. 20, 1964; Whitlow, 3,236,064, Feb. 22, 1966.

One of the major deficiencies that has prevented the successful operation of absorption type air conditioners on automobiles is the fact that insufficient heat is present in exhaust conduits of the internal combustion engines during some driving modes and, in particular, during idle and low engine speeds.

The prior art taught the use of devices for extracting heat from the exhaust stream, of an internal combustion engine, in order to actuate the generator and the refrigerant contained therein of an absorption type generator. Due to the low temperature of exhaust gas flowing through the exhaust conduit during some driving modes, such as idle and low speeds, inadequate heat exchange would take place between the conduit and the absorption type air conditioner's generator. Therefore the refrigerant would not circulate. Under this condition, inadequate or no air conditioning would result, since there would be insufficient heat to actuate the refrigerant. Basically this is accomplished by first providing a means for increasing the exhaust gas temperature. This is done by utilizing a direct flame afterburner attached to the exhaust conduit of the internal combustion engine which provides hot gases from idle mode to high speeds. An example of the direct flame afterburner is shown in Eannarino et al., 3,285,709, Nov. 15, 1966. Since this device will generate heated exhaust gases in excess of 1000° F. throughout all modes of a driving cycle, prior art devices cannot safely operate. Therefore improved devices for extracting exhaust gas heat for actuating absorption generators are required.

Briefly, the present invention is an improved device, of a self adaptive nature, which extracts the proper amount of heat from the hot gases exiting from direct flame afterburner. It maintains the proper amount of heat in the device for efficient and constant operation of the generator of an absorption type heat exchanger. Adequate safety valves are provided to prevent danger of overtemperature. Three variations of this generic principle are used. In one variation a metal slug is normally in contact with the hot output portion of the afterburner. When air conditioning is required, the rod is pulled into low, medium or high position contact with the absorption type air conditioner's generator that contains refrigerant therein. A thermostat determines when the generator operating temperature is beginning to rise. At this point a solenoid is actuated and the rod is pushed out of contact with the generator.

In a second variation, the hot exhaust gases, from the afterburner, heats a liquid stream surrounding the afterburner conduit. This liquid passes through a coil in the generator where the heat is transferred to the refrigerant in the generator. A thermostat senses any increase in temperature beyond normal and actuates two valves that shut off the liquid flow through the coil that enters the generator.

The third variation uses a diverter valve in the exhaust conduit which meters the proper amount of hot gases into the device. The hot gases circulate and bring the generator and inside of the device to proper operating temperature. When the proper temperature is reached, the valves close thus retaining the heat and preventing any further entry of gases. As the temperature drops, the valves will open to allow further entry of hot gases. The valves prevent any danger of overtemperature.

These features and others will be further described in the following description and claims in which there is set forth a preferred embodiment of the invention showing the principle of operation and details of construction.

Drawings accompany the disclosure and the various views thereof may be briefly described as:

FIG. 1, a semidiagrammatic view of generator of absorption type air conditioner actuated by a metal rod that conveys heat from hot gases flowing through afterburner output section.

FIG. 2, a semidiagrammatic view of generator of absorption type air conditioner heat actuated by a hot liquid flow from afterburner body through a heat exchange coil.

FIG. 3, a semidiagrammatic view of generator of absorption type air conditioner heat activated by a flow of hot exhaust gases from output of afterburner through the generator heat exchanger.

Referring to the drawings:

Having specific reference now to the drawings and with particular reference to FIG. 1, numeral 1 indicates a compartment section on the exit portion of an afterburner, where high temperatures are present that heats a metal rod 2, which is normally partly in compartment section 1 and protrudes through openings 3 into direct contact and thus provide heat conduction to passage 4 of an absorption type air conditioner stainless steel clad generator 5, where the metal rod 2 is positioned by means of the remote cable assembly 6 through the air conditioning cooling range of high, medium, low and off which corresponds respectively to rod 2 being approximately completely inside, halfway inside, partially inside or completely outside of passage 4, and a thermostat 7 is preset to protect against over-temperaturing of generator 5 which will if so activated control solenoid 8 which will remove rod 2 out of contact with passage 4 and further into compartment section 1.

Referring to FIG. 2, the afterburner wall 9 is surrounded by a liquid containing metal jacket 10, with a liquid 11 flowing through metal jacket 10 that picks up heat from wall 9 and conveys it by flow and conduction through input opening 12 of heat exchange coil 13, which is inside absorption type air conditioner's generator 14, where liquid after passing through coil 13 exits back to the water jacket 10 through exit opening 12, with a thermostat 15 attached to generator 14, where thermostat 15 when actuated by overtemperature will control solenoids 16 that will close flaps 17 in order to prevent further flow of liquid through heat exchange coil 13, and where control of the air conditioning cooling level of high, medium, low and off are controlled by a remote controlled flexible cable assembly 18, that is connected to valve cam 19 that closes valves 20 in increments of opened flow, to restricted, to shut off so as to correspond with the four positions of remote cable assembly 18.

Referring to FIG. 3, the hot exhaust gases leave the afterburner and enter conduit opening 21 into conduit 22, where from a remotely actuated position the cable assembly 23 moves the flapper valve 24 to which is ganged valve 25 into an off position so that valves 24 and 25 are set such that most of the hot exhaust gases are bypassed around the heat exchange device 26, and when the cable assembly 23 is set on maximum it moves the flapper valve 24 so that it is parallel to the gas flow in conduit 22 and is prevented from entering the bypass conduit 27 because valve 25 is now closed, thus allowing maximum flow of hot exhaust gases to enter the inner heat exchange device 26 by encountering valve 28, which is normally in a slant position and ganged to thermostat valve 29, which is normally in an open position, which in turn is attached to a stainless steel clad generator 30 where the gases enter passage opening 31, where hot gases circulate through passageways 32 and progressively transfers heat to generator 30, then gases exit through valve opening 33, where attached to generator 30 is thermostatic valve 34, which is normally open, and enters outer chamber 35, where gases circulate through channel 36 and exit through opening 37, where thermostat valve 38 is attached to generator 30 and allows exit of gases through conduit 39 to output conduit 40 and out the tail pipe 41, and if the generator 30 exceeds safe operating temperature, this condition is sensed by thermostats 29, 34, and 38 which close off passage openings 31, 33 and 37 to prevent further flow of hot gases through the device until temperature of generator 30 returns to safe operating temperature.

From the foregoing description, it will be apparent that the invention provides a very practical, efficient, and safe auto exhaust actuated generator device for absorption air conditioners. As will be understood by those familiar with the art, the invention may be embodied in other specific forms without departing from the spirit or essential characteristics whereof. The embodiments disclosed are therefore to be considered in all respects as illustrative rather than restrictive, the scope of the invention being indicated by the appended claims.

What is claimed as new is as follows:

1. An afterburner exhaust-heat actuated generator for absorption type refrigeration units, in combination with an afterburner of an internal combustion engine comprising:

(a) a conduit which conveys the hot exhaust-gases from the afterburner to the multiple chamber containing the generator of an absorption type refrigeration unit, (b) a multiple chamber with heat insulation to maximize heat retention within the chamber and having:

(1) an input conduit having one main output to the chamber and a second output that bypasses the chamber and that contains two mechanically-ganged valves that are controlled by a remote cable assembly that will, when no refrigeration is desired, shut the main valve and simultaneously open the bypass valve thus allowing exhaust gases to bypass the chamber, and when refrigeration is required the main valve is opened in increments to increase the exhaust-heat gas flow to the chamber and in synchronism close off the bypass valve in increments to reduce the exhaust-heat gas flow through the bypass conduit;

(c) the main valve zone containing a valve which is connected to and actuated by a heat sensing diaphragm whose probe end is in contact with the liquid refrigerant contained in the generator and when the refrigerant is relatively cool allows the valve to remain at an angle so that maximum flow of exhaust-heat gases enter the generator portion of the chamber to begin the refrigeration cycle and when the probe senses an excessive temperature will close the opening to the generator and cause the exhaust-heat gases to exit through the main conduit to the output conduit of the chamber and thence to the tailpipe exhaust, (d) an inner chamber, where the exhaust-heat gases enter and a generator, where the gases circulate completely around it and cause heat to be transferred to the liquid refrigerant contained in the generator which results in the liquid evaporating and beginning the refrigerating cycle, after which the gases exit through an exhaust port at the output of the inner chamber until the generator reaches normal operating temperature, at which time the valve, sensing the proper temperature of the liquid refrigerant, will actuate the exhaust valve and thus close off the inner chamber thereby causing the inner chamber to retain the heat because of its insulated chamber so that extended safe operation of the generator is possible, (e) an outer insulated chamber, which further retains the heat for operation of the generator and then exhausts the gases to the output of the chamber and an output valve, will close when proper temperature of the liquid refrigerant is achieved to prevent reverse flow of exhaust-heat gases into the output of the chamber.

2. As defined in claim 1, an afterburner exhaust-heat actuated generator for absorption type refrigeration units, in combination with an afterburner of an internal combustion engine where the exhaust-heat of the afterburner is conducted to the generator by means of a metal rod in the afterburner exhaust-heat gas stream where said metal rod is positioned in incremental fashion by means of a remote control cable so that varying amounts of heat is conducted to the generator and the liquid refrigerant contained therein, and therefore controls the rate of refrigerant evaporation and hence the amount of refrigeration cooling, and includes a thermostat on the generator that senses overtemperature which activates a solenoid that disengages said metal rod from the generator surface thus reducing the generator liquid refrigerant temperature to safe operating limits.

3. As defined in claim 1, an afterburner exhaust-heat actuated generator for absorption type refrigeration units, in combination with an afterburner of an internal combustion engine where the exhaust-heat of the afterburner is conducted to the generator by means of an intermediate liquid jacket that is heated by the afterburner exhaust-heat gases, and where this intermediate heated liquid is conveyed by a conduit to the generator where heat is transferred to the generator and the liquid refrigerant contained therein, and with a remote control cable assembly that controls the input and output valve to vary the intermediate liquid flow so that the amount of heated liquid provided to the generator will be maximum for high degree of refrigeration cooling and a minimum for a low degree of refrigeration cooling.

4. As defined in claim 1, an afterburner exhaust-heat actuated generator for absorption type refrigeration units, in combination with an afterburner of an internal combustion engine where the generator heat sink outer surface is clad with stainless steel to protect the generator from high temperature and corrosive exhaust gases.

References Cited

UNITED STATES PATENTS

| 3,153,441 | 10/1964 | Pippert et al. | 62—238 X |
| 3,230,731 | 1/1966 | Hess | 62—238 |

WILLIAM J. WYE, Primary Examiner

U.S. Cl. X.R.

62—238, 239, 476, 497